(12) United States Patent
Witbrock

(10) Patent No.: US 6,944,609 B2
(45) Date of Patent: Sep. 13, 2005

(54) SEARCH RESULTS USING EDITOR FEEDBACK

(75) Inventor: Michael J. Witbrock, Austin, TX (US)

(73) Assignee: Lycos, Inc., Waltham, MA (US)

(*) Notice: Subject to any disclaimer, the term of this patent is extended or adjusted under 35 U.S.C. 154(b) by 625 days.

(21) Appl. No.: 09/982,204

(22) Filed: Oct. 18, 2001

(65) Prior Publication Data

US 2003/0078914 A1 Apr. 24, 2003

(51) Int. Cl.$^7$ ............................................. G06F 17/30
(52) U.S. Cl. ............................................. 707/3; 707/7
(58) Field of Search .................... 707/1–10, 100–104.1, 707/200–205

(56) References Cited

U.S. PATENT DOCUMENTS

| | | | | |
|---|---|---|---|---|
| 5,724,571 A | * | 3/1998 | Woods | 707/5 |
| 5,748,954 A | | 5/1998 | Mauldin | 395/610 |
| 6,006,222 A | | 12/1999 | Culliss | 707/5 |
| 6,014,665 A | | 1/2000 | Culliss | 707/5 |
| 6,240,408 B1 | * | 5/2001 | Kaufman | 707/3 |
| 6,691,108 B2 | * | 2/2004 | Li | 707/3 |

* cited by examiner

Primary Examiner—Mohammad Ali
(74) Attorney, Agent, or Firm—Fish & Richardson P.C.

(57) ABSTRACT

A method for producing a results list for a search query includes producing a first results list of entries from a search algorithm, the first results list corresponding to a term in the search query, the first results list being ordered according to relevance rankings, modifying a feature of the first results lists by an editor, the modification being made according to an editorial rule, determining a reliability score for the editor, the reliability score being based upon the modification made the editor, combining the modification made by the editor in a combined search index, the combined modification being included in the combined search index according to the determined reliability of the editor, and using the combined search index to produce a second results list which corresponds to the term in the search query, the second results list being ordered according to relevance rankings.

22 Claims, 7 Drawing Sheets

SEARCH RESULTS USING EDITOR FEEDBACK

TECHNICAL FIELD

This invention relates to using editorial feedback of various Internet objects.

BACKGROUND

The Internet can be viewed as a large collection of documents, for example, text files, web-pages, newsgroup postings or pictures. Internet search engines provide a means of searching through the vast amount of documents to produce a results list of the documents found which match the terms in a search query. Typically the results list is presented as a list of document summaries that includes hyperlinks ("links") that connect each entry to the appropriate Internet document. The results list is generally ranked by relevance (in relation to the query), with each entry included in the list presented either higher or lower on the list according to the relevance ranking as determined by the search engine being used. The way in which these relevance rankings are determined is constantly evolving as the Internet continues to evolve.

Search engines apply different algorithms to "filter" the available documents and assign relevance rankings to the documents reviewed. The relevance rankings are generally stored in a search index which corresponds to documents for a specific search term (or related search terms).

Initially, Internet search engines applied "content-based" filtering which is simply examining the number of times that a query search term appeared within a document, such that the greater the number of times that a search term appeared, the more relevant the document was considered and the higher it was ranked. However, content-based filtering produces rankings which are easily manipulated by the author of the documents reviewed, that is, an author can fill their web-page with multiple copies of the words that they believe will be searched upon and thereby increase the alleged relevance of their web-page.

More advanced ranking methods apply "link analysis" algorithms, i.e., examining the links contained within a document to other documents with relatively high relevance rankings. However, as with the manipulation of terms in a web-page, as discussed above, an author can increase the number of links to other documents with high relevance rankings in order to increase the alleged relevance of their web-page.

Editor-controlled search engines use a "staff" of editors (paid or volunteer) to manually select and rank individual web-page documents contained in a results list for a specific search term from a ranked search index. Documents may have their rankings changed, or document may be added and removed from the index over time as the editors perform their reviews. Since there billions of web-page documents available on the Internet, and the number of documents continues to grow at a tremendous pace, the amount of labor needed to maintain a current and complete editor-controlled search index is very high. The Open Directory Project (ODP) is an example of a co-operative editing process that uses a large number of volunteer editors to assess and modify the relevance rankings of documents related to a search term or within a specific category. ODP applies rules to the editor selection process. The end result of ODP is a editor-controlled ranking index that can be searched directly, however, the editorial feedback is not used to improve the efficiency of an automated search engine algorithm.

SUMMARY

According to an aspect of this invention a method for producing a results list for a search query includes producing a first results list of entries from a search algorithm, the first results list corresponding to a term in the search query, the first results list being ordered according to relevance rankings, modifying a feature of the first results lists by an editor, the modification being made according to an editorial rule, determining a reliability score for the editor, the reliability score being based upon the modification made the editor, combining the modification made by the editor in a combined search index, the combined modification being included in the combined search index according to the determined reliability of the editor, and using the combined search index to produce a second results list which corresponds to the term in the search query, the second results list being ordered according to relevance rankings.

One or more of the following features may also be included: producing a first results list that includes producing a first results list that corresponds to at least one search term, modifying a feature according to an editorial rule that includes modifying any feature of the first results list, modifying a feature according to an editorial rule that includes modifying an allowed changeable feature, the allowed changeable feature being one or more of relevance ranking, entry addition, entry deletion and document summary, modifying a feature includes modifying a feature within a pre-defined range or percentage, modifying an allowed changeable feature that includes modifying a feature within a pre-defined range or percentage, determining a reliability score that further includes comparing a ranking change for an entry by a first editor to a median ranking change for the entry by a second editor, determining a reliability score that further includes comparing a summary change for an entry to a previous summary contained in the first results list, determining a reliability score that further includes determining a difference in a number or a percentage of click-throughs which result from the editor modification, combining the modification made by the editor that further includes multiplying the reliability score by the feature modification, using the combined results to produce a second results list includes using the combined search index by a search engine and wherein the method is performed at least twice.

According to a further aspect of this invention a method for producing a results list for a search query, the method includes producing a first results list of entries from a search algorithm, the first results list corresponding to a term in a first search query, the first results list being ordered according to relevance rankings, modifying a feature of the first results lists by an editor, the modification being made according to an editorial rule, determining a reliability score for the editor, the reliability score being based upon the modification made the editor, combining the modification made by the editor in a combined search index, the combined modification being included in the combined search index according to the determined reliability of the editor, detecting a difference between the feature contained in the first results list and the corresponding modified feature contained in the combined search index, and determining a rule that corresponds to the detected difference or similarity.

One or more of the following features may also be included: producing a second results list from the search algorithm, the second results list corresponding to the term in the first search query and modifying the second results lists by applying the rule to a feature contained in the second results list, detecting a difference that further includes detecting a change to a relevance ranking feature, detecting a difference that further includes detecting an added feature, detecting a difference that further includes detecting a deleted feature and detecting a difference that further includes detecting a change to a document summary feature.

According to a further aspect of this invention a computer program product residing on a computer readable medium having a plurality of instructions stored thereon which, when executed by the processor, cause that processor to produce a first results list of entries from a search algorithm, the first resultst list corresponding to a term in a search query, the first results list being ordered according to relevance rankings, modify a feature of the first lists according to an editorial rule, determine a reliability score for the editorial modification, the reliability score being based upon the editorial modification, combine the editorial modification in a combined search index, the combined modification being includes in the combined search index according to the reliability score of the editor, and use the combined search index to produce a second results list which corresponds to the term in the search query, the second results lists being ordered according to relevance rankings.

One or more of the following features may also be included: wherein the instructions causing a computer to modify a feature of the first lists according to an editorial rule and further include instructions causing a computer to modify a feature according to an editorial rule, wherein the instruction causing a computer to modify a feature according to an editorial rule and further include instructions causing a computer to modify an allowed changeable feature, the allowed changeable feature being one or more of relevance ranking, entry addition, entry deletion and document summary, wherein the instructions causing a computer to determine a reliability score for the editorial modification and farther include instructions causing a computer to compare a ranking change for an entry by a first editor to a median ranking change for the entry by a second editor.

Embodiments of the invention may have one or more of the following advantages. For example, a combined editorial search index is created that automatically assesses the reliability of each editorial input, which reduces the potential of nefarious editorial input. In some embodiments, a combination of paid and un-paid editors are used in evaluating specific results lists, which further reduces the possibility of nefarious inputs from an editor being included in a search index. Some embodiments apply machine learning techniques to the combined editorial feedback search index, i.e., detecting a change in relevance rankings to a previously generated index for a specific search term, and then determining and storing a rule that reflects the detected change. The stored rule may then be re-played by a search engine, i.e., applying the stored rule to produce a refined results list for the specific search term. The stored rules may also be re-played by a search engine to re-rank results lists for a search term which has not been evaluated by the editorial process.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

The Internet and the World Wide Web can be viewed as a collection of hyperlinked documents with search engines as a primary interface for document retrieval. Search engines (e.g., lycos.com) allow the user to enter a query and perform a search based on that query. A list of potential matches is then generated that provides links to potentially relevant documents.

Figure 1:
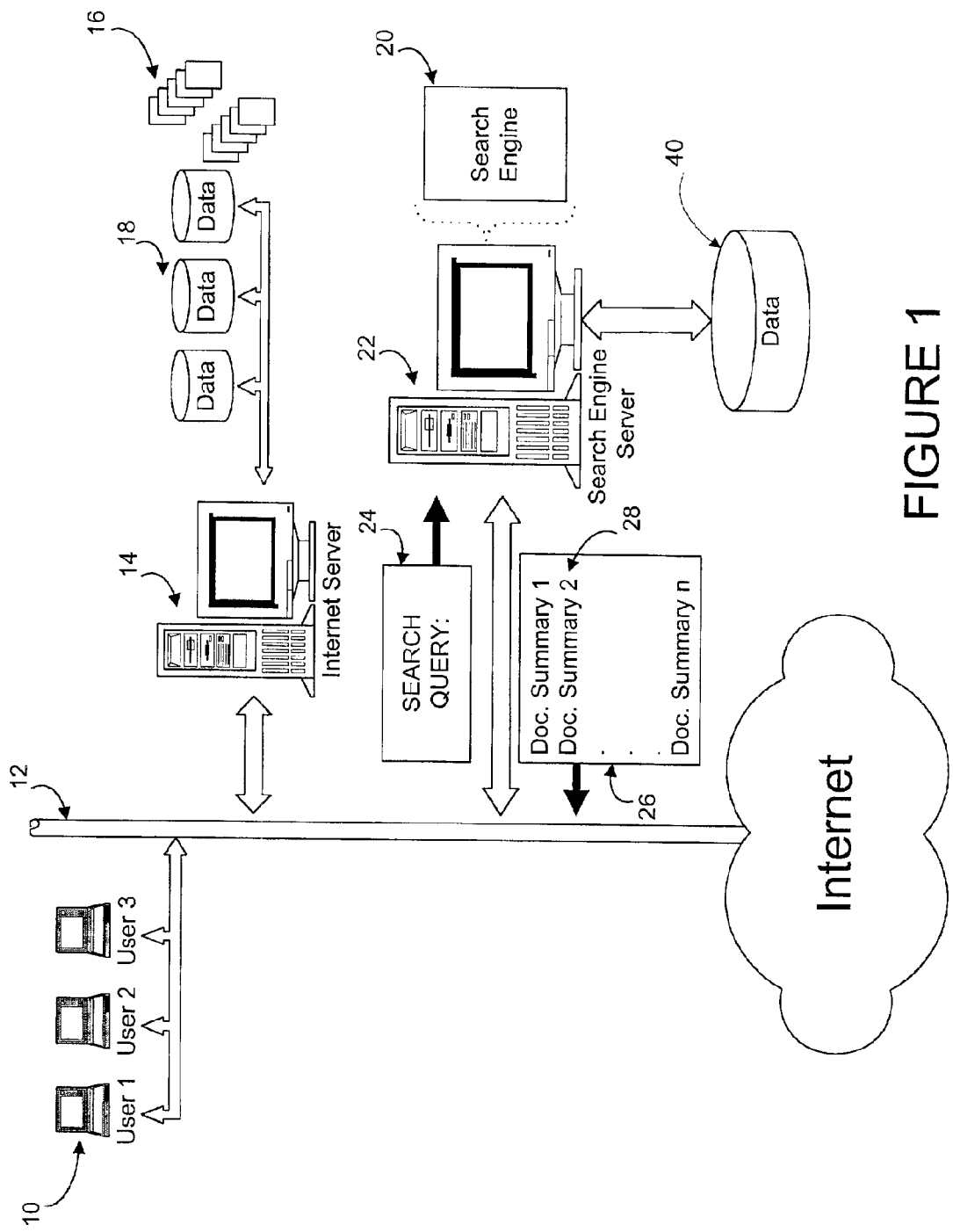
FIG. 1 is a diagrammatic view of the Internet.

Referring to FIG. 1, there is shown a number of users 10 accessing the Internet via a network 12 that is connected to Internet server 14. The Internet server 14 serves web pages and Internet-based documents 16 to user 10. Internet server 14 typically incorporates some form of database 18 to store and serve documents 16.

When user 10 wishes to search for information on a specific topic, user 10 utilizes search engine 20 running on search engine server 22. User 10 enters a search query 24 into search engine 20, which provides a results list 26 of potential sources for information related to the search terms of query 24. Each entry 28 on results list 26 is a document summary for a specific relevant document (i.e., a web-page) 16 on the Internet. These documents 16 may be located on search engine server 22, Internet server 14, or any other server (not shown) on the network 12; and each document is associated with a uniform resource locator (URL) address. Typically, each entry 28 includes a hyperlink, which, when selected causes a display of the document associated with the URL.

When search engine 20 provides list 26 to user 10 in response to query 24, the individual entries in list 26 are arranged in accordance with their perceived level of relevance. Search engine 20 may determine the ranking of the entries 28 on list 26 by examining the documents themselves to determine certain factors, for example, the number of documents linked to the entry, or the presence of the search term within the document itself; etc. The ranking of the entries 28 on list 26 may also be determined from a previously stored search index of rankings in a database 40. As discussed above, a search index may be created by a search engine algorithm or by storing editor-created rankings.

Search engines can further enhance their document ranking accuracy by comparing stored queries (query-to-query relationships) to make suggestions to the user concerning modifications or supplemental search terms that would better tailor the user's query to the specific information they are searching for. Depending on which selection the user makes, the user's search will be appended and tailored accordingly.

Figure 2:
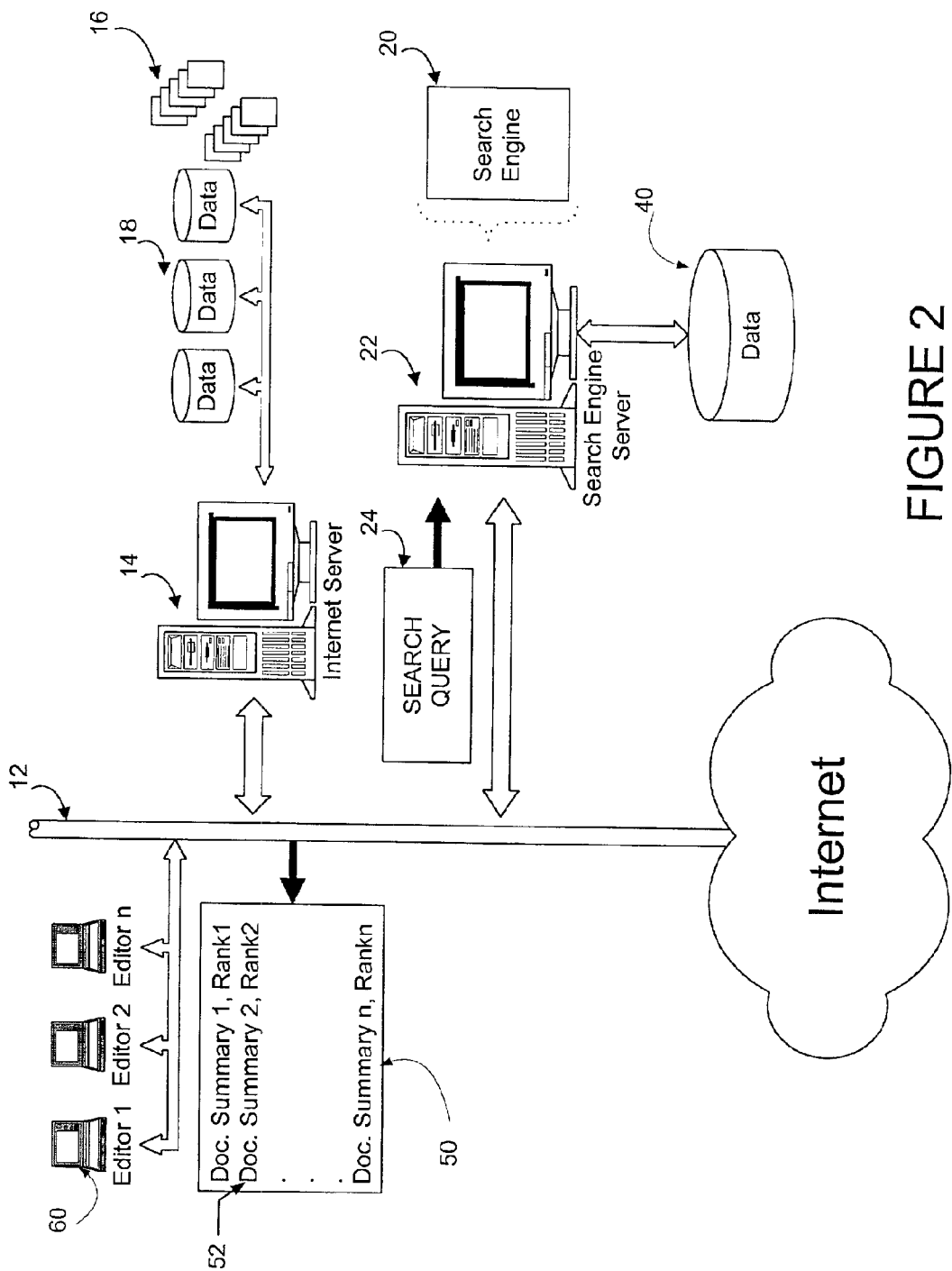
FIG. 2 is a diagrammatic view of an editors ranking a results list.

Referring to FIG. 2, there is shown a number of editors 60 who are evaluating and ranking a results list 50 received from search engine server 22. Results list 50 includes multiple entries 52 which include relevance ranks, Rank1–n, which correspond to the perceived relevance of an entry. As discussed above, the editorial changes to results list 50 are returned to the search engine server 22 for inclusion in an editorially ranked search index (not shown) that is stored in database 40.

Figure 3:
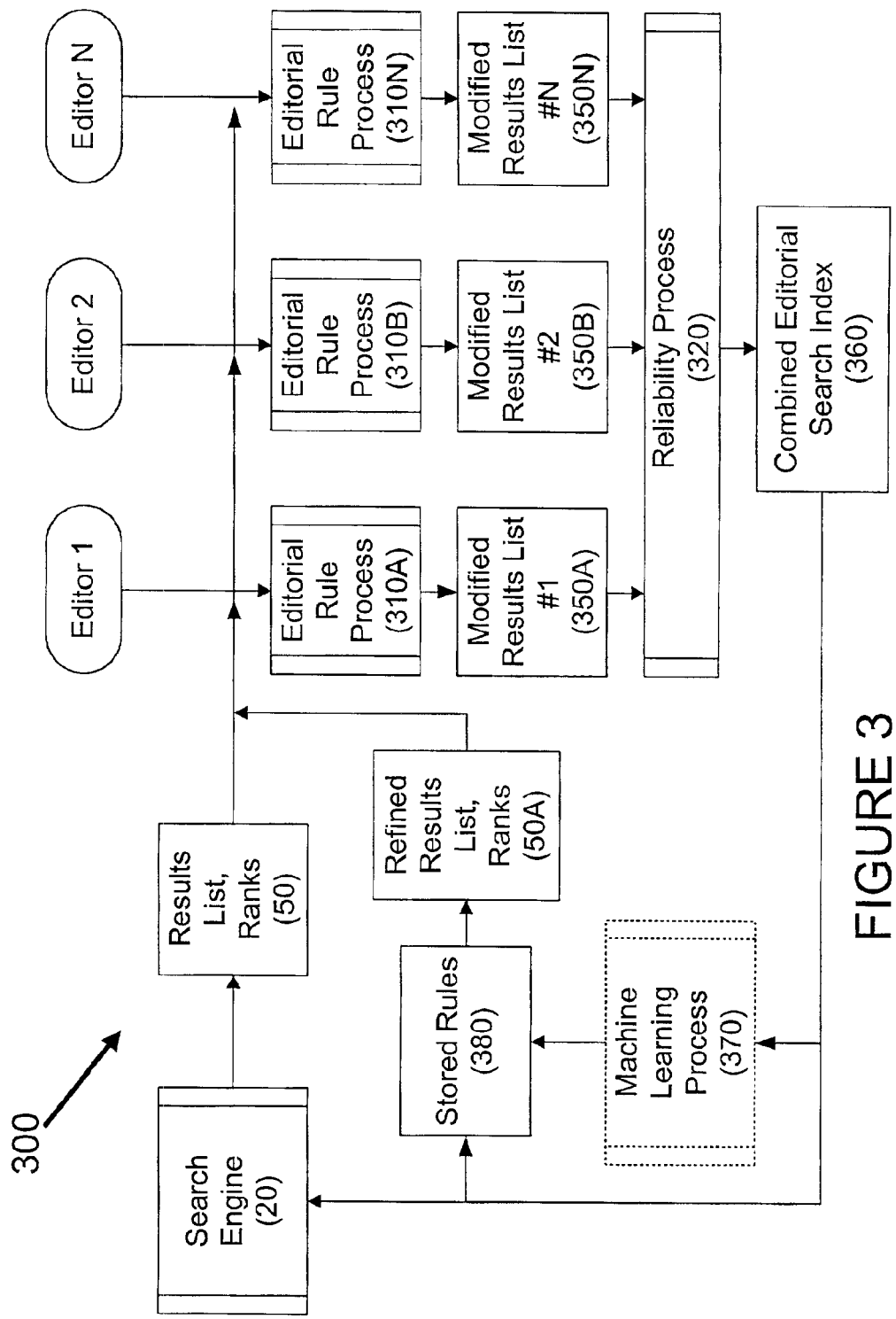
FIG. 3 is flowchart of a method for creating a combined editorial search index.

Referring to FIG. 3, there is shown a number of editors, Editor1–EditorN, participating in an editorial feedback process 300. In operation, search engine 20 produces an initial results list 50 that includes relevance rankings for each entry in the list. Each editor, Editor1–EditorN, may then perform modifications to the results list 50 according to set of editorial rules applied through editorial rule processes 310A–310N, respectively. Editorial rule processes 310A–310N provide a way to control which features of the results list may be modified by and how they may be modified by each editor. For example, the editorial rule process 310A–310N may allow a change in the following features: relevance rankings (i.e., changing the position of an entry within the results list), a deletion of an entry, an addition of an entry or a modification to a document summary. The editorial rule processes 310A–310N may allow complete editorial control or may only allow for partial editorial control of the features contained in results list 50. For instance, if partial editorial control is implemented:

An editor may be able to change rankings of an entry, but, only within a pre-defined limit, that is only allowing an editor to move an entry up or down in the rankings by a pre-defined number; or, An editor may not be able to move an entry which is ranked at a pre-defined percentage above or below another entry; or, An editor may not be allowed to add an entry to the results list unless the ranking associated with the new entry is at a certain pre-defined level; or, An editor may not be allowed to change document summaries; or, An editor may only be allowed to make partial changes to a document summary.

Please realize that the editorial rule process 310 applies a set of rules to control which features of a results list may be modified and how they may be modified.

The editorial changes made to the features of the results list 50 by editors 310A–310N are stored in modified results lists 350A–350N, respectively. Reliability process 320 then applies a set of rules to determine a reliability score for each editor. Reliability process 320 then uses the determined reliability score for each editor together with the changes stored in modified results list 350A–350N to weight the individual feature changes made by each editor into a combined editorial search index 360. The reliability process 320 provides quality control to the process 300, that is, avoiding the input of un-reliable editorial changes, or nefarious inputs (i.e., an editor who has attempted to make changes to favor an entry without good reason). In operation, if the editor maintains a high reliability rating then the changes made by that editor are given more weight in the combined editorial search index 360. For example, reliability process 320 may include determining a reliability score by:

Comparing a ranking change by an editor to the median change made by other editors to the same ranking, and if the difference is greater than a pre-defined limit, then the reliability score of the editor would be lowered; or, (If a document summary may be changed by an editor) comparing words in the new summary to words in the old summary and if a pre-defined percentage (or number) of words included in the new summary do not match the old summary (or in the document itself) then the reliability score of the editor would be lowered; or, Comparing how far up or down an entry is moved within results list 50 by an editor to the median movement made to that entry by other editors, and if the movement is greater or lower than the median by a pre-defined limit, then the reliability score of the editor would be lowered; or, Determining the 'click-through' increase or decrease as a result of an editorial change in the results list (i.e., if Internet users actual selections of the links included in a modified entry increase or decrease by a pre-defined limit, then the reliability score of the editor can also be changed.)

Please realize that any heuristic method could be used to rate editorial reliability.

Combined editorial search index 360 may be used directly by search engine to produce other results lists 50 corresponding to the rankings stored in index 360.

Figure 4A:
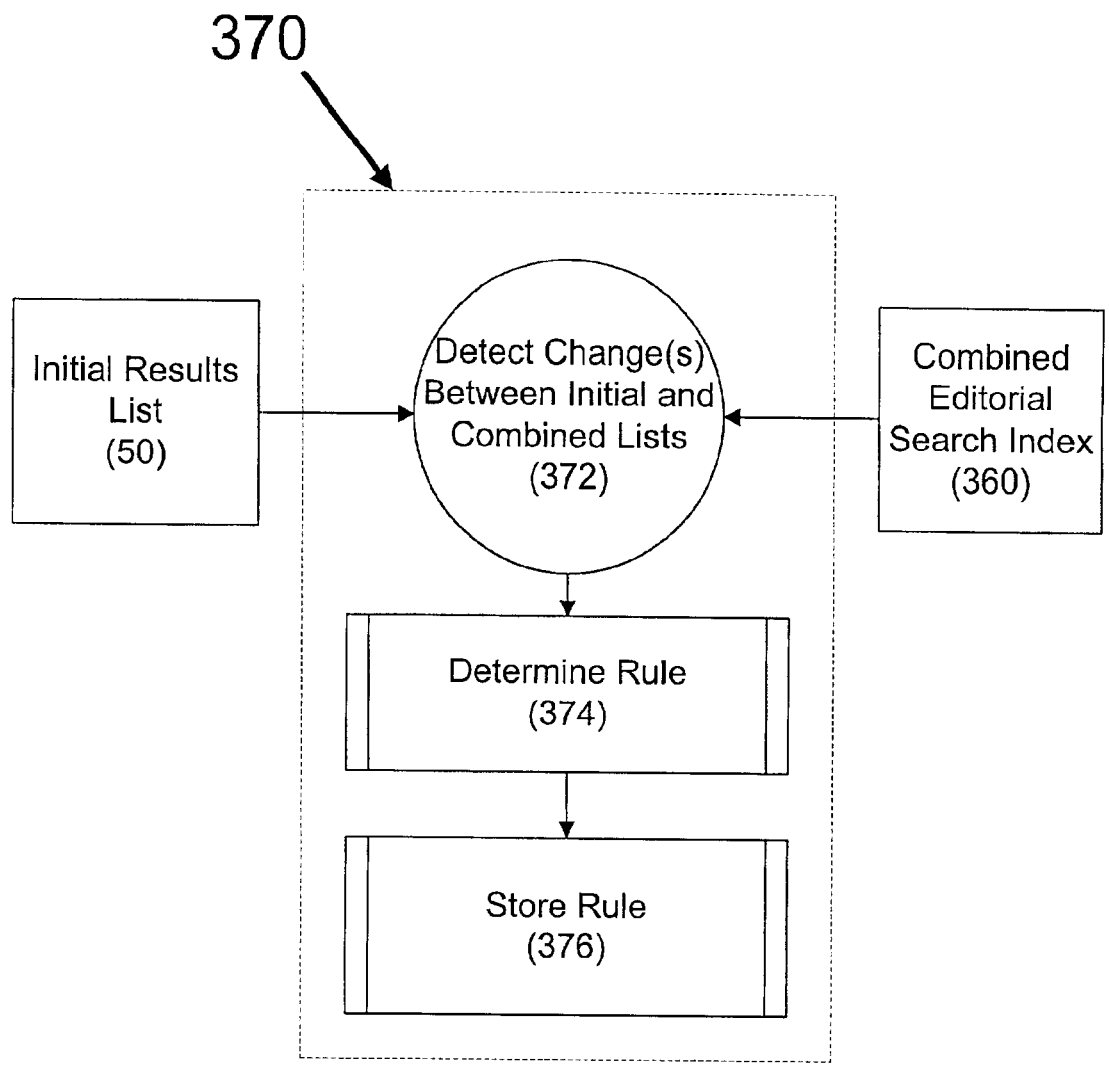
FIG. 4A is a flowchart of a machine learning process.

Referring now to FIGS. 3 and 4A, there is shown machine learning process 370 which may be included in process 300. Machine learning process 370 includes a detection process 372 that compares/contrasts the similarities/differences between the initial results list 50 and the combined editorial search index 360. Detected changes or similarities from detection process 372 are then used by a determine rule process 374, to determine a rule related to the detected change or similarity. The determined rule is then stored 376 for possible use by search engine 20 to produce a refined results lists 50A which is ranked according to the stored rules 380. Detection process 372 may include detecting that:

an entry has been deleted from results list 50; or, an entry has been added to combined search index 360; or, an entry has been lowered in ranking; or, an entry has been raised in ranking; or, a summary has been changed.

Machine learning process then determines 374 a rule to reflect the detected change in rankings, and stores that rule 376 for use by search engine 20. For example, for a search term: "Michael Douglas", the combined editorial search index reflects a change in ranking position from position 10 to position 4 for a document related to "Catherine Zeta-Jones" (with a URL of 117). Machine learning process 370 stores 376 a rule that "URL 117" was promoted from position 10 to position 4 for the search term "Michael Douglas". If a new results list is produced which includes an entry corresponding to URL 117 at position 10 (or somewhere near position 10), the search engine can apply ("replay") the stored rule which will cause the entry corresponding to URL 117 to be moved to position 4 within the new results list. Please realize that the stored rule is generally broadened to capture the "intent" of the learned change, i.e., the stored rule above may promote URL 17 to position 4 from a range of other positions, not just from position 10, i.e., promoting URL 117 to position 4 from a positions ranging from 5 to 15.

Results lists may be produced from a single search term, or may be produced from several related terms, i.e., terms that produce a results list that includes a large number of common entries. By grouping results lists into common categories the number of results lists are reduced and the number of editors required to evaluate the results lists is also reduced. Therefore, a group of editor may be assigned to a specific search term, or a category of related terms, so the editors may be registered to that specific term or category and receive notification when new documents are available and require editorial review. Similarly, the machine learning techniques may be applied to learn and store rules based on a common category of queries, i.e., the search term "Michael Douglas" and all search terms considered common to this search term may have a rule applied to a defined category.

Often a small number of search terms are common to a relatively large number of search queries, that is, many users are searching for the most popular related terms. Therefore, for those highly popular terms, the editorial group assigned may include paid editors to augment and supervise the volunteer editorial process. This would allow for a more reliable review of the editorial changes before they are combined and provide for more control of the combined search index.

Figure 4B:
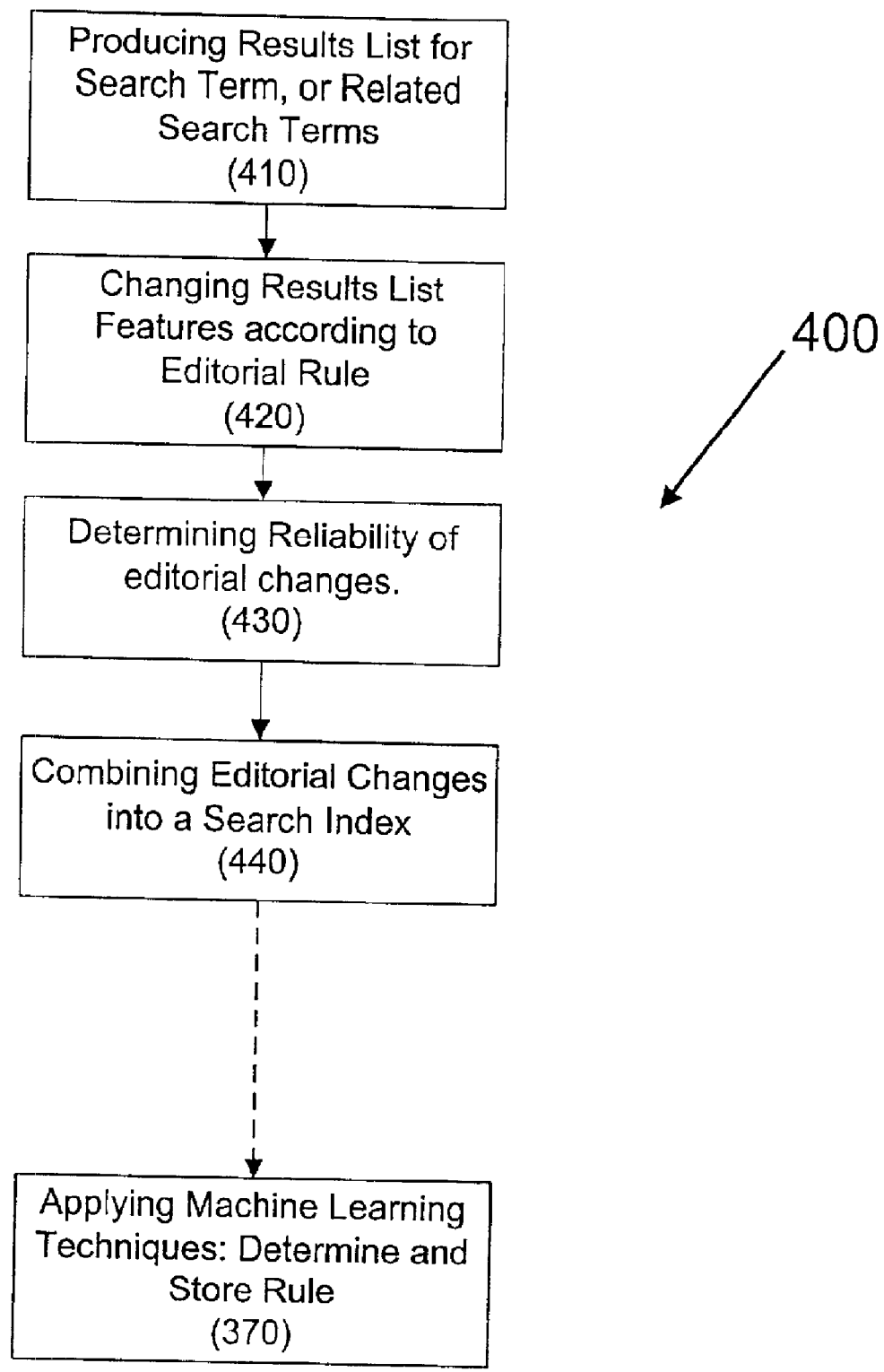
FIG. 4B is a flowchart of the method for creating a combined editorial search index.

Now referring to FIG. 4B, there is shown a method 400 for creating a combined editorial search index, and, optionally, applying machine learning techniques to the search index to determine a machine learning rule. Method 400 includes: producing 410 a results list for a search term (or related search terms) by applying a search algorithm to a set of documents, changing 420, by an editor, a results list feature according to a set of editorial rules, determining 430 the predicted reliability of the changed feature and/or the predicted reliability of the editor and combining 440 the weighted editorial changes into a combined editorial search index. Method 400 may also include applying 370 machine learning techniques to determine and store a rule based on a detected change between the initial results lists and the combined search index.

Figure 5:
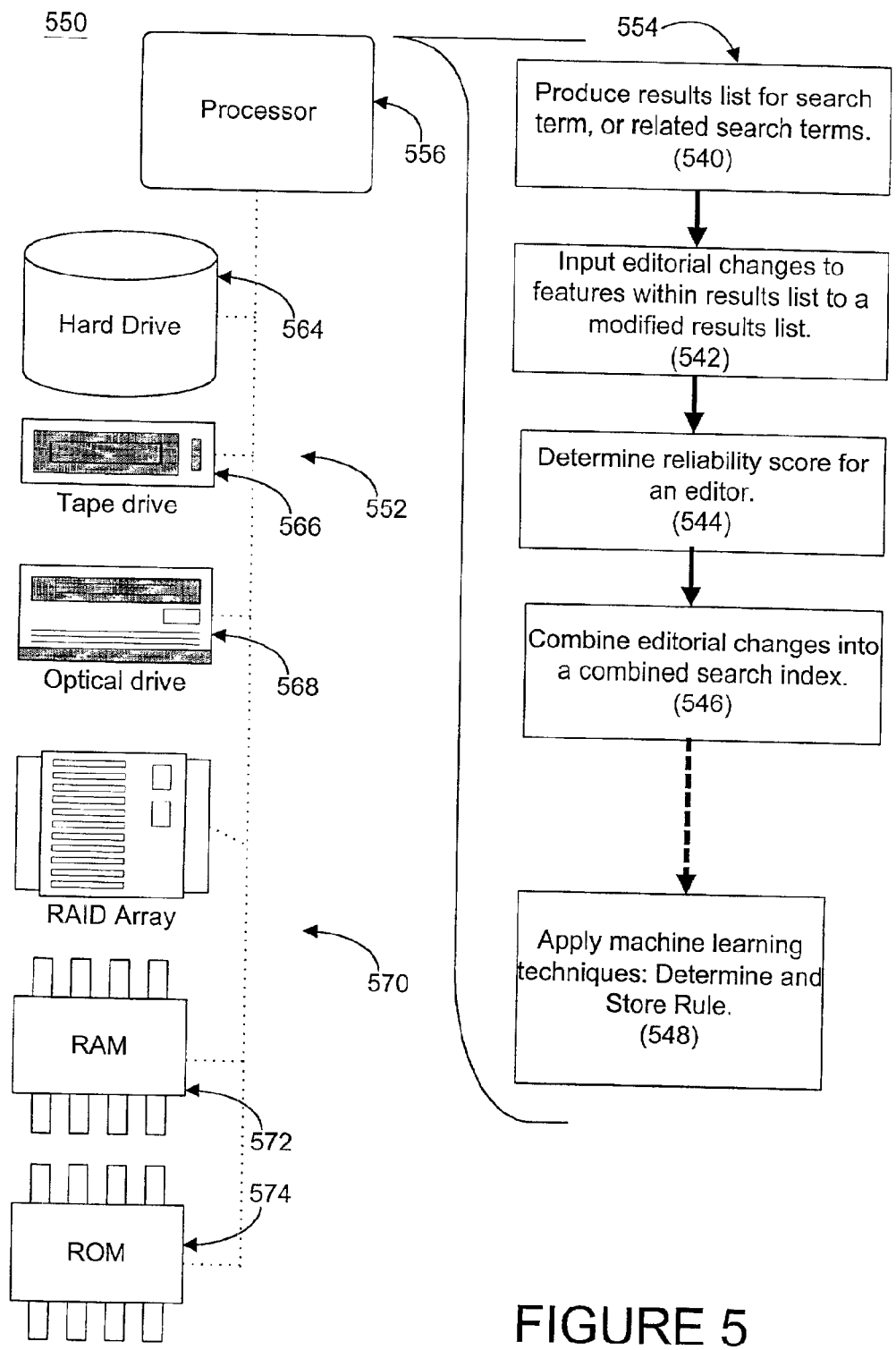
FIG. 5 is a diagrammatic view of another embodiment of a method for creating a combined editorial search index.

Now referring to FIG. 5, there is shown a computer program product 550 residing on a computer readable medium 552 having a plurality of instructions 554 stored thereon. When executed by processor 556, instructions 554 cause processor 556 to: produce 540 a results list for a search term (or related search terms), input 542 editorial changes of features in the results list by applying a set of editorial rules, determine 544 the reliability score for an editor and combine 546 weighted editorial changes into a combined search index. Computer program product 550 may also include instructions 554 causing processor to: apply 548 machine learning techniques to determine and store a rule corresponding to a detected change between the results list and the combined search index.

Typical embodiments of computer readable medium 552 are: hard drive 564; tape drive 566; optical drive 568; RAID array 570; random access memory 572; and read only memory 574.

Figure 6:
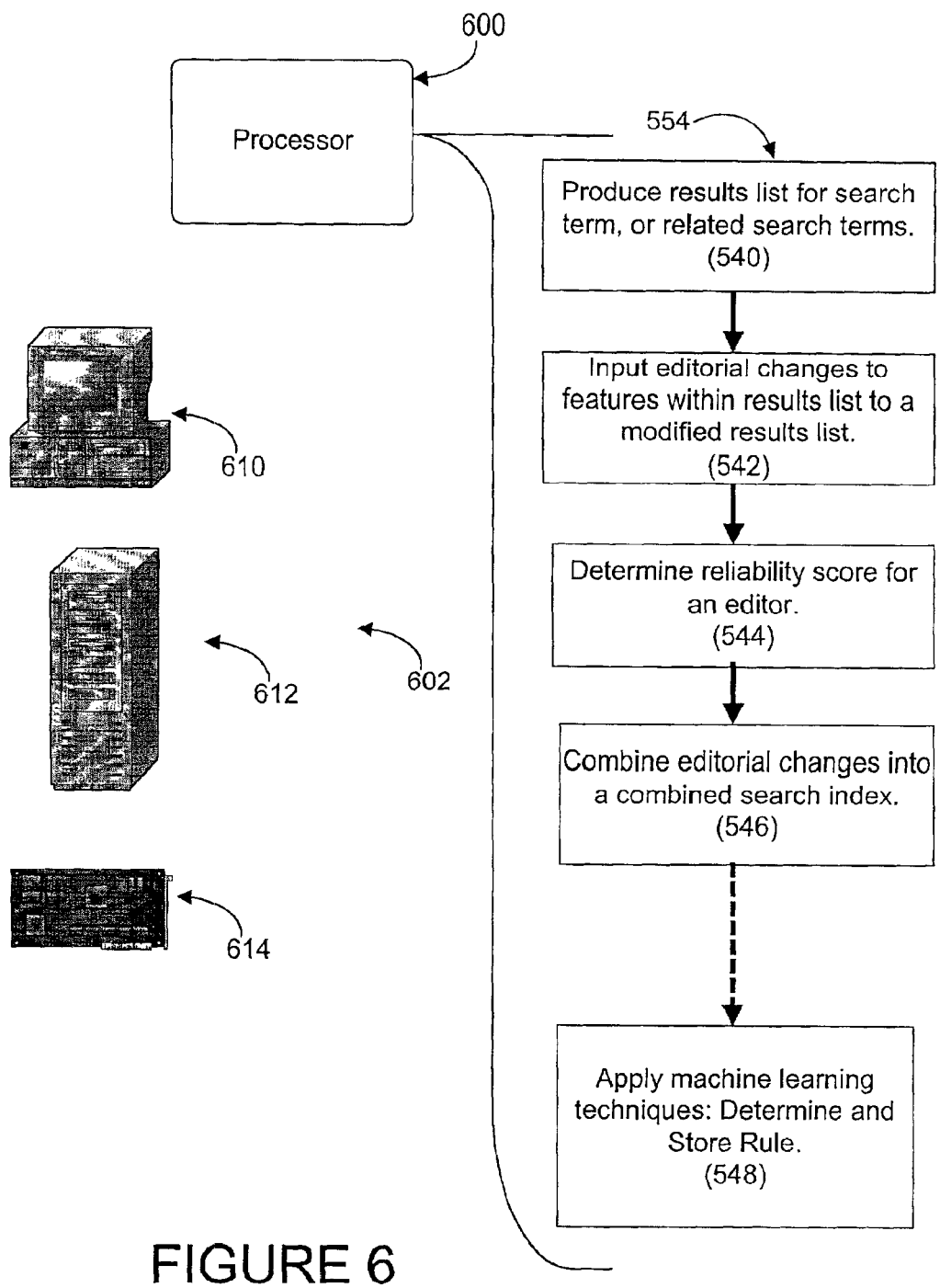
FIG. 6 is a diagrammatic view of another embodiment of a method for creating a combined editorial search index.

Now referring to FIG. 6, there is shown a processor 600 and memory 602 configured to: produce 540 a results list for a search term (or related search terms), input 542 editorial changes of features in the results list by applying a set of editorial rules, determine 544 the reliability score for an editor and combine 546 weighted editorial changes into a combined search index. Processor 600 and memory 602 may also be configured to: apply 548 machine learning techniques to determine and store a rule corresponding to a detected change between the results list and the combined editorial search index.

Processor 600 and memory 602 may be incorporated into a personal computer 610, a network server 612, or a single board computer 614.

A number of embodiments of the invention have been described. Nevertheless, it will be understood that various modifications may be made without departing from the spirit and scope of the invention. Accordingly, other embodiments are within the scope of the following claims.

What is claimed is:

1. A computer implemented method for producing a results list for a search query, the method comprising:
   producing a first results list of entries from a search algorithm, the first results list corresponding to a term in the search query, the first results list being ordered according to relevance rankings;
   modifying a feature of the first results lists by an editor, the modification being made according to an editorial rule;
   determining a reliability score for the editor, the reliability score being based upon the modification made the editor;
   combining the modification made by the editor in a combined search index, the combined modification being included in the combined search index according to the determined reliability of the editor; and
   using the combined search index to produce a second results list which corresponds to the term in the search query.

2. The method of claim 1 wherein producing a first results list includes producing a first results list that corresponds to at least one search term.

3. The method of claim 1 wherein modifying a feature according to an editorial rule includes modifying any feature of the first results list.

4. The method of claim 1 wherein modifying a feature according to an editorial rule includes modifying an allowed changeable feature, the allowed changeable feature being one or more of relevance ranking, entry addition, entry deletion and document summary.

5. The method of claim 3 wherein modifying a feature includes modifying a feature within a pre-defined range or percentage.

6. The method of claim 4 wherein modifying an allowed changeable feature comprises modifying a feature within a pre-defined range or percentage.

7. The method of claim 1 wherein determining a reliability score further comprises:
   comparing a ranking change for an entry by a first editor to a median ranking change for the entry by a second editor.

8. The method of claim 1 wherein determining a reliability score further comprises:
   comparing a summary change for an entry to a previous summary contained in the first results list.

9. The method of claim 1 wherein determining a reliability score further comprises:
   determining a difference in a number or a percentage of click-throughs which result from the editor modification.

10. The method of claim 1 wherein combining the modification made by the editor further comprises:
    multiplying the reliability score by the feature modification.

11. The method of claim 1 wherein using the combined results to produce a second results list includes using the combined search index by a search engine.

12. The method of claim 1 wherein said method is performed at least twice.

13. A computer implemented method for producing a results list for a search query, the method comprising:
    producing a first results list of entries from a search algorithm, the first results list corresponding to a term in a first search query, the first results list being ordered according to relevance rankings;
    modifying a feature of the first results lists by an editor, the modification being made according to an editorial rule;

determining a reliability score for the editor, the reliability score being based upon the modification made the editor;

combining the modification made by the editor in a combined search index, the combined modification being included in the combined search index according to the determined reliability of the editor;

detecting a difference between the feature contained in the first results list and the corresponding modified feature contained in the combined search index; and determining a rule that corresponds to the detected difference or similarity.

14. The method of claim 13 further comprises:

producing a second results list from the search algorithm, the second results list corresponding to the term in the first search query;

modifying the second results lists by applying the rule to a feature contained in the second results list.

15. The method of claim 14 wherein detecting a difference further comprises:

detecting a change to a relevance ranking feature.

16. The method of claim 14 wherein detecting a difference further comprises:

detecting an added feature.

17. The method of claim 14 wherein detecting a difference further comprises:

detecting a deleted feature.

18. The method of claim 14 wherein detecting a difference further comprises:

detecting a change to a document summary feature.

19. A computer program product residing on a computer readable medium having a plurality of instructions stored thereon which, when executed by the processor, cause that processor to:

produce a first results list of entries from a search algorithm, the first resultst list corresponding to a term in a search query, the first results list being ordered according to relevance rankings;

modify a feature of the first lists according to an editorial rule;

determine a reliability score for the editorial modification, the reliability score being based upon the editorial modification;

combine the editorial modification in a combined search index, the combined modification being includes in the combined search index according to the reliability score of the editor; and use the combined search index to produce a second results list which corresponds to the term in the search query.

20. The computer program product of claim 19 wherein the instructions causing a computer to modify a feature of the first lists according to an editorial rule further comprise instructions causing a computer to:

modify a feature according to an editorial rule.

21. The computer program product of claim 20 wherein the instruction causing a computer to modify a feature according to an editorial rule further comprise instructions causing a computer to:

modify an allowed changeable feature, the allowed changeable feature being one or more of relevance ranking, entry addition, entry deletion and document summary.

22. The computer program product of claim 20 wherein the instructions causing a computer to determine a reliability score for the editorial modification further comprise instructions causing a computer to:

compare a ranking change for an entry by a first editor to a median ranking change for the entry by a second editor.

* * * * *

UNITED STATES PATENT AND TRADEMARK OFFICE
CERTIFICATE OF CORRECTION

PATENT NO. : 6,944,609 B2  Page 1 of 1
APPLICATION NO. : 09/982204
DATED : September 13, 2005
INVENTOR(S) : Michael J. Witbrock It is certified that error appears in the above-identified patent and that said Letters Patent is hereby corrected as shown below:

Column 10, Line 10, Claim 19
    Delete the word "includes", and replace with --included--.

Signed and Sealed this

Fifth Day of December, 2006

JON W. DUDAS
*Director of the United States Patent and Trademark Office*